US012494301B2

(12) United States Patent
Lee et al.

(10) Patent No.: US 12,494,301 B2
(45) Date of Patent: Dec. 9, 2025

(54) CONDUCTIVE MESH STRUCTURE, ANTENNA DEVICE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Won Hee Lee, Jeollabuk-do (KR); In Kak Song, Jeollabuk-do (KR); So Eun Jang, Jeollabuk-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 111 days.

(21) Appl. No.: 18/524,433

(22) Filed: Nov. 30, 2023

(65) Prior Publication Data

US 2024/0203617 A1 Jun. 20, 2024

(30) Foreign Application Priority Data

Dec. 20, 2022 (KR) ........................ 10-2022-0179595

(51) Int. Cl.

*H01B 5/14* (2006.01)
*H01Q 1/22* (2006.01)
*H01Q 9/04* (2006.01)

(52) U.S. Cl.

CPC ............. *H01B 5/14* (2013.01); *H01Q 1/2258* (2013.01); *H01Q 9/0407* (2013.01)

(58) Field of Classification Search

CPC .......... H01B 5/12; H01B 5/14; H01Q 1/2258; H01Q 1/364; H01Q 1/38; H01Q 9/0407
See application file for complete search history.

(56) References Cited

U.S. PATENT DOCUMENTS

| | | | | |
|---|---|---|---|---|
| 10,768,766 | B2 * | 9/2020 | Lee | G06F 3/044 |
| 2015/0177872 | A1 * | 6/2015 | Kim | G06F 3/04166 345/174 |
| 2015/0212537 | A1 * | 7/2015 | Cok | G06F 3/047 216/13 |
| 2016/0190678 | A1 * | 6/2016 | Hong | H01Q 1/44 343/700 MS |
| 2020/0176526 | A1 * | 6/2020 | Yoon | H10K 59/131 |
| 2023/0035171 | A1 * | 2/2023 | Park | H01Q 9/40 |
| 2023/0261383 | A1 * | 8/2023 | Park | H01Q 1/007 343/702 |
| 2023/0299483 | A1 * | 9/2023 | Kim | H01Q 1/48 |
| 2023/0402755 | A1 * | 12/2023 | Yoon | H01Q 5/35 |
| 2023/0420855 | A1 * | 12/2023 | Park | H01Q 9/40 |

FOREIGN PATENT DOCUMENTS

| | | |
|---|---|---|
| KR | 10-2007-0106000 A | 10/2007 |
| KR | 10-2016-0080444 A | 7/2016 |

* cited by examiner

*Primary Examiner* — Thien M Le
(74) *Attorney, Agent, or Firm* — The PL Law Group, PLLC

(57) ABSTRACT

A conductive mesh structure includes a dielectric layer, a first mesh pattern disposed on a top surface of the dielectric layer and including conductive lines that intersect each other, a second mesh pattern disposed on the top surface of the dielectric layer and including dummy lines that intersect each other and segmented portions that cut portions of each of the dummy lines, and separation portions separating the first mesh pattern and the second mesh pattern. A ratio of a width of each of the separation portions to a width of each of the segmented portions is in a range from 0.7 to 1.6.

18 Claims, 7 Drawing Sheets

CONDUCTIVE MESH STRUCTURE, ANTENNA DEVICE INCLUDING THE SAME AND IMAGE DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2022-0179595 filed on Dec. 20, 2022, in the Korean Intellectual Property Office, the entire disclosure of which is incorporated herein by reference for all purposes.

BACKGROUND

1. Field of the Invention

The present invention relates to a conductive mesh structure, an antenna device including the same and an image display device including the same. More particularly, the present invention relates to a conductive mesh structure including intersecting conductive lines, an antenna device including the same and an image display device including the same.

2. Description of the Related Art

As information technologies have been developed, a wireless communication technology such as Wi-Fi, Bluetooth, etc., is combined or embedded in an image display device, an electronic device, an architecture, etc. For example, an antenna for implementing a high frequency or ultra-high frequency communication is being applied to an image display device combined with a communication device such as a smart phone.

Additionally, various sensor members such as a touch sensor and a fingerprint sensor are also combined with the image display device so that various communication/sensing functions can be added to a display function.

The antenna or the sensor member may include a conductor such as a metal layer, and transmittance or image quality of the image display device may be reduced or deteriorated by the conductor. Further, if a regular pattern structure such as a mesh structure and a pixel arrangement structure included in the image display device overlap each other, a moiré phenomenon may occur to interrupt an image of the image display.

Therefore, construction of conductive lines included in the mesh structure in consideration of the transmittance of the mesh structure and the moiré with the pixel arrangement structure of the image display device is required. Additionally, construction of the conductive lines in consideration of radiation properties and sensitivity from the antenna or the sensor member using mesh structures is required.

SUMMARY

According to an aspect of the present invention, there is provided a conductive mesh structure having improved optical and electrical properties.

According to an aspect of the present invention, there is provided an antenna device having improved optical and electrical properties.

According to an aspect of the present invention, there is provided a display device having improved optical and electrical properties.

(1) A conductive mesh structure, including: a dielectric layer: a first mesh pattern disposed on a top surface of the dielectric layer, the first mesh pattern including conductive lines that intersect each other: a second mesh pattern disposed on the top surface of the dielectric layer, the second mesh pattern including dummy lines that intersect each other and segmented portions that cut portions of each of the dummy lines; and separation portions separating the first mesh pattern and the second mesh pattern, wherein a ratio of a width of each of the separation portions to a width of each of the segmented portions is in a range from 0.7 to 1.6.

(2) The conductive mesh structure of the above (1), wherein the width of each of the separation portions is defined as a minimum separation distance between each of the conductive lines and each of the dummy lines adjacent to each of the conductive lines.

(3) The conductive mesh structure of the above (1), wherein the first mesh pattern has a polygonal shape defined by straight lines passing through at least three of the separation portions.

(4) The conductive mesh structure of the above (3), wherein the separation portions are formed to overlap each side of the polygonal shape in a plan view, or to be adjacent a periphery of each side of the polygonal shape.

(5) The conductive mesh structure of the above (4), wherein some of the separation portions are adjacent to the periphery of each side of the polygonal shape.

(6) The conductive mesh structure of the above (1), wherein one end of each of the conductive lines is inclined with respect to an extension direction of each of the conductive lines.

(7) The conductive mesh structure of the above (1), wherein the first mesh pattern has first unit cells defined by neighboring conductive lines of the conductive lines, and the first unit cells have a diamond shape or a polygonal shape.

(8) The conductive mesh structure of the above (7), wherein a distance between facing sides of each of the first unit cells is greater than the width of each of the separation portions.

(9) The conductive mesh structure of the above (1), wherein a ratio of the width of each of the separation portions to a line width of each of the conductive lines is in a range from 0.7 to 1.6.

(10) The conductive mesh structure of the above (1), wherein the second mesh pattern has second unit cells defined by neighboring dummy lines of the dummy lines, and each of the second unit cells at least one segmented portion of the segmented portions.

(11) The conductive mesh structure of the above (10), wherein the at least one segmented portion is formed on at least one side of the second unit cell.

(12) The conductive mesh structure of the above (11), wherein the at least one segmented portion is formed on each of facing sides of the second unit cell, and a straight line connecting segmented portions formed on the facing sides is inclined with respect to a direction perpendicular to an extension direction of the facing sides.

(13) The conductive mesh structure of the above (1), wherein the conductive lines include first conductive lines and second conductive lines that intersect each other, and the dummy lines include first dummy lines and second dummy lines that intersect each other.

(14) The conductive mesh structure of the above (13), wherein the first conductive lines and the first dummy lines are parallel to each other, and the second conductive lines and the second dummy lines are parallel to each other.

(15) An antenna device including the conductive mesh structure according to the above-described embodiments.

(16) The antenna device of the above (15), including: an antenna unit including the first mesh pattern: and a dummy pattern disposed around the antenna unit, the dummy pattern including the second mesh pattern.

(17) The antenna device of the above (16), wherein the antenna unit includes a radiator and a transmission line connected to the radiator.

(18) The antenna device of the above (17), wherein the antenna unit further includes a signal pad connected to the transmission line, and the radiator and the transmission line include the first mesh pattern, and the signal pad has a solid structure.

(19) The antenna device of the above (15), further including a ground layer disposed on a bottom of the dielectric layer.

(20) An image display device including the antenna device according to the above-described embodiments.

A conductive mesh structure according to example embodiments may include a dielectric layer and a conductive mesh layer, and the conductive mesh layer may include a first mesh pattern and a second mesh pattern spaced apart from each other by a separation portion. The second mesh pattern may include a segmented portion therein. A ratio between a width of the separation portion to a width of the segmented portion may be adjusted within a predetermined range, thereby improving transmittance and suppressing visibility of the conductive mesh structure.

A line width of the conductive line and the width of the separation portion may be adjusted to a predetermined range. An electrical insulation between the first mesh pattern and the second mesh pattern may be improved, and visibility of the conductive mesh structure may be suppressed. Accordingly, light transmittance of the conductive mesh structure may be enhanced, and electrical properties and low resistance properties may be improved.

The conductive mesh structure may be applied to an antenna device. The antenna device may include an antenna unit including the first mesh pattern and a dummy pattern including the second mesh pattern. Accordingly, a visual recognition of the antenna unit due to optical and physical deviations may be prevented. Additionally, an electrical insulation between the antenna unit and the dummy pattern may be improved through the separation portions to prevent a signal interference caused by the dummy pattern.

DETAILED DESCRIPTION

Embodiments of the present invention provide a conductive mesh structure including a dielectric layer and a conductive mesh layer.

Additionally, embodiments of the present invention provide an antenna device to which the conductive mesh structure is applied. However, application of the conductive mesh structure according to embodiments of the present invention is not limited to the antenna devices. The conductive mesh structure can be used in various electrical and electronic devices that require high transparency and low resistance properties such as a touch sensor, a fingerprint sensor, an optical filter, an electromagnetic filter, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first," "second," "upper," "lower," "top," "bottom," etc., herein are used to relatively distinguish positions of components, and are not intended to designate absolute positions.

Figure 1:
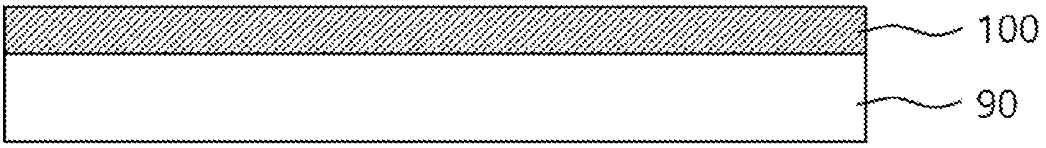
FIGS. 1 and 2 are a schematic cross-sectional view and a schematic plan view, respectively, illustrating a conductive mesh structure in accordance with exemplary embodiments.
Figure 2:
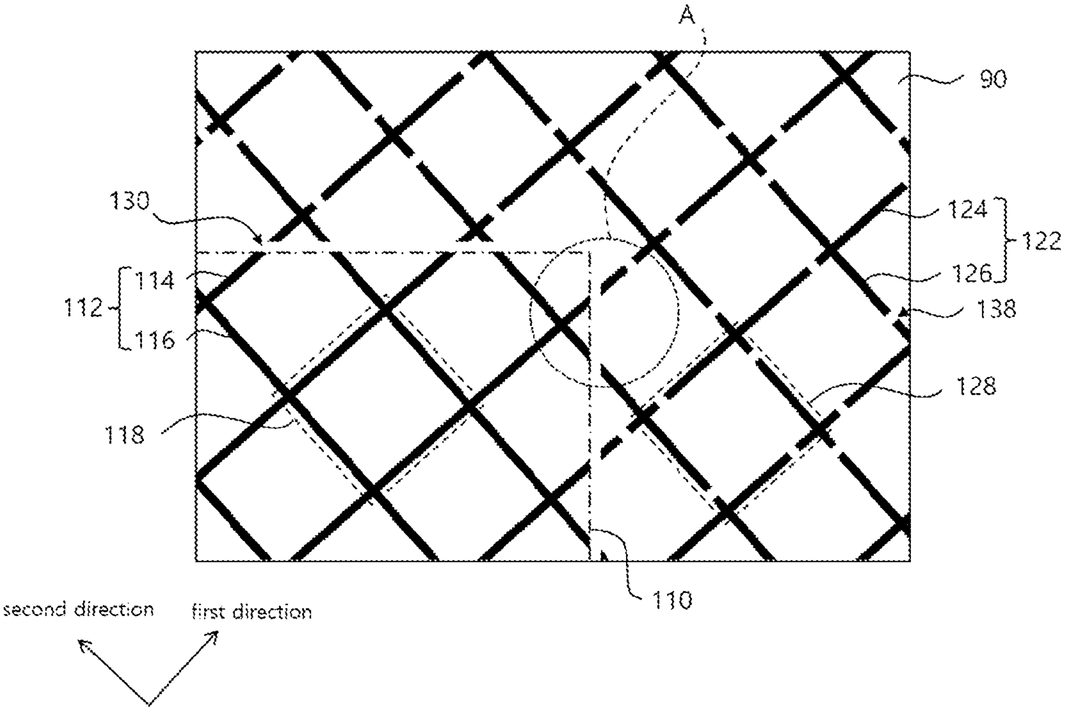

FIGS. 1 and 2 are a schematic cross-sectional view and a schematic plan view, respectively, illustrating a conductive mesh structure in accordance with exemplary embodiments.

Referring to FIGS. 1 and 2, the conductive mesh structure may include a dielectric layer 90 and a conductive mesh layer 100 formed on a top surface of the dielectric layer 90.

The dielectric layer 90 may include, e.g., a transparent resin material. For example, the dielectric layer 90 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin: an acrylic resin such as polymethyl (meth)acrylate and polyethyl (meth)acrylate: a styrene-based resin such as polystyrene and an acrylonitrile-styrene copolymer: a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide: an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin: a silicone-based resin, etc. These may be used alone or in a combination thereof.

An adhesive film such as an optically clear adhesive (OCA), an optically clear resin (OCR), etc., may be included in the dielectric layer 90.

In an embodiment, the dielectric layer 90 may include an inorganic insulating material such as glass, silicon oxide, silicon nitride, silicon oxynitride, etc.

In an embodiment, the dielectric layer 90 may be provided as a substantially single layer.

In an embodiment, the dielectric layer 90 may have a multi-layered structure of at least two layers. For example, the dielectric layer 90 may include a base substrate and a substrate layer, and may include an adhesive layer between the base substrate and the substrate layer.

The conductive mesh layer 100 may have a mesh structure formed by electrode lines crossing each other.

Referring to FIG. 2, the conductive mesh layer 100 may include conductive lines 112 and dummy lines 122.

The conductive lines 112 may include first conductive lines 114 and second conductive lines 116 crossing each other. The dummy lines 122 may include first dummy lines 124 and second dummy lines 126 crossing each other.

In FIG. 2, two directions being parallel to the top surface of the dielectric layer 90 and intersecting each other are defined as a first direction and a second direction. The first direction and the second direction are set for convenience of descriptions, and are not intended to designate absolute directions, and refer to relative directions of the conductive lines 112.

For example, the first direction may correspond to an extending direction of the first conductive line 114 and/or the first dummy line 124. The second direction may correspond to an extending direction of the second conductive line 116 and/or the second dummy line 126. An intersection angle between the first direction and the second direction may correspond to an intersection angle of the conductive lines 112 crossing each other.

The conductive mesh layer 100 may include a first mesh pattern 110 including conductive lines 112 and a second mesh pattern including dummy lines 122. For example, the second mesh pattern may refer to a pattern other than the first mesh pattern 110 among mesh patterns of the conductive mesh layer 100.

The conductive lines 112 and the dummy lines 122 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the conductive lines 112 and the dummy lines 122 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the conductive lines 112 and the dummy lines 122 may include a transparent conductive oxide such indium tin oxide (ITO), indium zinc oxide (IZO), zinc oxide (ZnOx), indium zinc tin oxide (IZTO), etc.

In some embodiments, the conductive lines 112 and the dummy lines 122 may include a stacked structure of a transparent conductive oxide layer and a metal layer. For example, the conductive lines 112 and the dummy lines 122 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The conductive lines 112 and the dummy lines 122 may include a blackened portion, so that a reflectance at a surface of the conductive mesh layer 100 may be decreased to suppress a visual recognition of the antenna unit due to a light reflectance.

In an embodiment, a surface of the metal layer included in the conductive mesh layer 100 may be converted into a metal oxide or a metal sulfide to form a blackened layer. In an embodiment, a blackened layer such as a black material coating layer or a plating layer may be formed on the conductive mesh layer 100 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In some embodiments, the first mesh pattern 110 and the second mesh pattern may be defined by repeating unit cells 118 and 128, respectively. Each of the first mesh pattern 110 and the second mesh pattern may include open areas defined by due to inner spaces of the unit cells 118 and 128.

The first mesh pattern 110 may include first unit cells 118 defined by conductive lines 112 crossing each other. Each of the first unit cells 118 may refer to a space divided by the first conductive lines 114 and the second conductive lines 116.

The first unit cell 118 may have a polygonal shape. For example, the first unit cell 118 may have a rhombus shape. The shape of the first unit cell 118 may be changed according to shape and arrangement of the conductive lines 112. For example, the first unit cell 118 may have various polygonal shapes such as a square, a pentagon, a hexagon, etc.

The second mesh pattern may include second unit cells 128 defined by dummy lines 122 crossing each other. Each of the second unit cells 128 may refer to a space divided by the first dummy lines 124 and the second dummy lines 126.

The second unit cells 128 may have a polygonal shape. For example, the second unit cell 128 may have various polygonal shapes such as a rhombus, a square, a pentagons, a hexagon, etc., and the shape of the second unit cell 128 may be designed according to shape and arrangement of the dummy lines 122.

In some embodiments, the second unit cell 128 may have substantially the same shape as that of the first unit cell 118. Accordingly, the first mesh pattern 110 and the second mesh pattern may have substantially the same pattern shape and arrangement. Accordingly, the visual recognition of an antenna pattern or an electrode due to optical and physical deviation may be prevented.

The conductive mesh layer 100 may include separation portions 130 that physically and electrically separate the conductive lines 112 and the dummy lines 122. For example, the first mesh pattern 100 and the second mesh pattern may be spaced apart from each other by the separation portions 130.

In one embodiment, each of the separation portions 130 may be defined as a region between the conductive lines 112 and the dummy lines 122 adjacent to each other. For example, the separation portion 130 may be a region between one end of the conductive line 112 and one end of the dummy line 122 adjacent to the one end of the conductive line 112. For example, one end of each of the conductive lines 112 may have a shape cut by the separation portion 130.

In example embodiments, the first mesh pattern 110 and the second mesh pattern may be physically and electrically separated by the separation portions 130. Thus, the first mesh pattern 110 may have electrical with respect to the second mesh pattern, and may prevent electrical signal deformation and interference caused by the second mesh pattern.

In example embodiments, the second mesh pattern may include a plurality of segmented portions 138. For example, the first dummy lines 124 and the second dummy lines 126 may be cut by the segmented portions 138. The second mesh pattern may be provided as an area that is not entirely electrically conducted by the segmented portions 138.

For example, each of the second unit cells 128 may include at least one segmented portion 138. Accordingly, interference with the first mesh pattern 110 may be suppressed by preventing a parasitic capacitance due to metal mesh patterns connected to each other. Thus, radiation properties, signal sensitivity, sensing performance, etc., of the first mesh pattern 110 may be improved.

In some embodiments, at least one of sides of the second unit cell 128 may include the segmented portion 138. Thus, the second unit cell 128 may be electrically insulated, and strong electric field generation due to a conduction between the second unit cells 128 may be prevented.

In some embodiments, the segmented portions 138 may be formed at all sides of the second unit cell 128 included in the second mesh pattern. For example, one segmented portion 138 may be formed at each side of the second unit cell 128. Accordingly, when the first mesh pattern 110 functions as a radiator of an antenna device, reduction of gain of the radiator signal disturbance caused by the second mesh pattern may be suppressed.

In one embodiment, the segmented portions 138 formed at facing sides of the second unit cell 128 may be located to deviate from each other in a direction perpendicular to an extending direction of the facing sides. For example, the extension direction of a straight line connecting the segmented portions 138 formed at two sides of the second unit cell 128 extending in the first direction may be inclined with respect to the second direction perpendicular to the first direction.

The segmented parts 138 may be arranged randomly to be staggered to each other in one second unit cell 128, so that the visual recognition of the mesh structure may be more effectively prevented.

In an embodiment, the segmented portions 138 formed in the second mesh pattern may be irregularly distributed. Accordingly, a moiré phenomenon due to an overlapping of regular patterns may be prevented to further suppress the visual recognition of the mesh structure.

In some embodiments, the first mesh pattern 110 may not include a segmented region where the conductive lines 112 are cut. For example, the first unit cell 118 may not include a segmented portion. Accordingly, the conductive lines 112 included in the first mesh pattern 110 may be connected to each other, and the first mesh pattern 110 may be electrically conducted as a whole.

Figure 3:
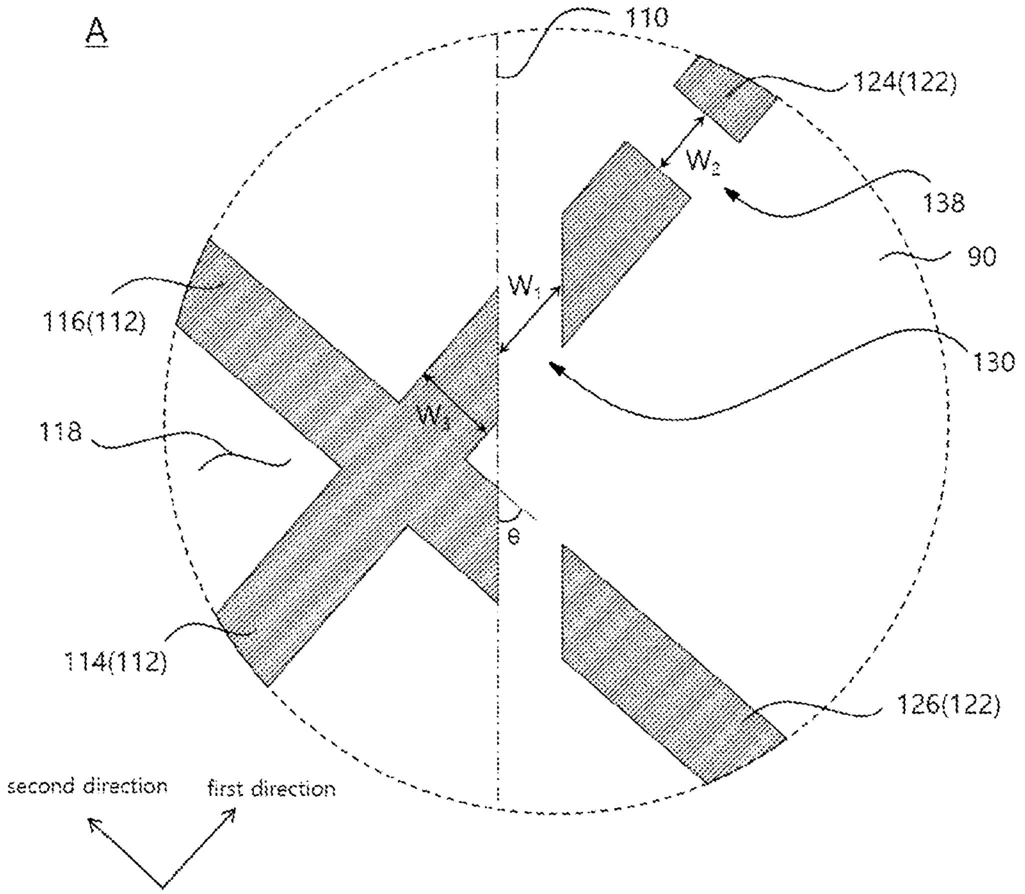
FIG. 3 is an enlarged plan view of a region A of FIG. 2.

FIG. 3 is an enlarged plan view of a region A of FIG. 2.

In example embodiments, a ratio ($W_1/W_2$) of a width $W_1$ of the separation portion 130 relative to a width $W_2$ of the segmented 138 may be in a range from 0.7 to 1.6.

The width $W_1$ of the separation portion 130 may be defined as a minimum separation distance between one end of the conductive line 112 and one end of the dummy line 122 closest to the conductive line 112. In an embodiment, the width of the separation portion 130 may be defined as a line width of the conductive line or a line width of the dummy line.

The width $W_2$ of the segmented portion 138 may be defined as a minimum separation distance between one ends of the dummy line 122 cut by the segmented portion 138.

Within the above range, optical uniformity may be improved throughout the conductive mesh layer 100, and a visual recognition of the separation portion 130 and the segmented portion 138 may be suppressed.

For example, if the with ratio of the separation portion 130 and the segmented portion 138 is not within the above range, optical and physical deviations between the separation portion 130 and the segmented portion 138 may be increased, resulting in degradation of the pattern uniformity between the first mesh pattern 110 and the second mesh pattern. Accordingly, the first mesh pattern 110 may be visually recognized by the user by the separation portion 130.

In some embodiments, the ratio $W_1/W_2$ of the width of the separation portion 130 to the width of the segmented portion 138 may be in a range from 0.8 to 1.4, from 0.8 to 1.3, or from 0.9 to 1.2. Within the above range, the width of the separation portion 130 may be adjusted to be substantially similar to the width of the segmented portion 138.

In example embodiments, a ratio ($W_1/W_3$) of the width W1 of the separation portion 130 to a line width $W_3$ of the conductive line 112 may be in a range from 0.7 to 1.6.

The line width $W_3$ of the conductive line 112 may be a length measured along a direction perpendicular to the extending direction of the conductive line 112.

For example, in FIG. 3, $W_3$ may be a line width of the first conductive line 114, and $W_1$ may be a minimum distance between the first conductive line 114 and the first dummy line 124 in the first direction. In an embodiment, when $W_3$ is a line width of the second conductive line 116, $W_1$ may be a minimum separation distance in the second direction between the second conductive line 116 and the second dummy line 126.

If the ratio of the width of the separation portion 130 relative to the line width of the conductive line 112 is less than 0.7, a region between the conductive line 112 and the dummy line 122 may not be completely removed and segmented during, e.g., an etching process. Further, a separation distance between the first mesh pattern 110 and the second mesh pattern may not be sufficiently achieved, and a parasitic capacity may be generated by the dummy lines 122 adjacent to the first mesh pattern 110.

Accordingly, the second mesh pattern may be electrically connected to the first mesh pattern 110, or an electrical signal of the first mesh pattern 110 may be distorted by the second mesh pattern.

If the ratio of the width of the separation portion 130 relative to the line width of the conductive line 112 exceeds 1.6, the resistance of the conductive line 112 may be increased due to the small line width, and electrical properties of the first mesh pattern 110 may be deteriorated. Additionally, the open area between the conductive line 112 and the dummy line 122 becomes relatively large, the shape of the first mesh pattern 110 may be recognized by the user.

The ratio $W_1/W_3$ of the width of the separation portion 130 relative to the line width of the conductive line 112 may be adjusted within the above range, an insulation between the first mesh pattern 110 and the second mesh pattern may be maintained with high reliability while increasing an optical transmittance of the conductive mesh structure. Thus, the visual recognition of the conductive mesh structure may be improved, and the first mesh pattern 110 may have low resistance and improved electrical properties.

In some embodiments, the ratio $W_1/W_3$ of the width of the separation portion 130 relative to the line width of the conductive line 112 may be in a range from 1.0 to 1.6. Within the range, electrical properties and optical transmittance of the conductive mesh structure may be further improved.

In an embodiment, the ratio $W_1/W_3$ of the width of the separation portion 130 relative to the line width of the conductive line 112 may be in a range from 1.0 to 1.4, or from 1.0 to 1.2.

In some embodiments, the line width $W_3$ of the conductive line 112 may be in a range from about 2 μm to about 6 μm. In the above range, the conductive line 112 may have a low resistance, and sufficient current flow and electric field generation may be implemented in the first mesh pattern 110.

In an embodiment, the line width of the conductive line 112 may be in a range from about 2.5 μm to 6 μm, or from about 3 μm to 5 μm.

In some embodiments, the widths of the separation portion 130 and the segmented portion 138 may each be in a range from about 2.5 μm to about 7 μm. Within this range, electrical properties and optical transmittance of the conductive mesh structure may be improved, and generation of the moiré may be suppressed.

In an embodiment, each width of the separation portion 130 and the segmented portion 138 may be in a range from about 3 μm to 6 μm, or from about 3 μm to 5 μm.

In some embodiments, the conductive line 112 and the dummy line 122 may each extend in a linear shape. Accordingly, a length of the conductive line 112 may be reduced, so that a signal transmission speed may be improved and the resistance may be reduced.

In an embodiment, the conductive line 112 and the dummy line 122 may extend in various shapes such as a wave shape or a sawtooth shape.

In some embodiments, the first conductive lines 114 and the first dummy lines 124 may be parallel to each other. For example, the first conductive lines 114 and the first dummy lines 124 may extend in the first direction.

In some embodiments, the second conductive lines 116 and the second dummy lines 126 may be parallel to each other. For example, the second conductive lines 116 and the second dummy lines 126 may extend in the second direction.

Thus, optical and physical deviations caused by an offset of the conductive lines 112 and the dummy lines 122 may be reduced, thereby suppressing the visual recognition of the separation portion 130 adjacent to the conductive lines 112 and the dummy lines 122. Accordingly, the optical transmittance of the conductive mesh structure may be further improved.

In example embodiments, the first mesh pattern 110 may have at least one linear side. For example, the first mesh pattern 110 may have a polygonal shape such as a rhombus, a trapezoid, a triangle, a square, a pentagon, a hexagon, etc.

In an embodiment, the side or a boundary of the first mesh pattern 110 may be defined by the separation portions 130. For example, each side of the first mesh pattern 110 may be defined by an imaginary straight line passing through at least three of the separation portions 130. For example, the first mesh pattern 110 may have a polygonal shape defined as straight lines passing through at least three of the separation portions 130.

The separation portions 130 may be formed at each side of the polygonal shape, or may be formed to be adjacent to each side.

For example, referring to FIG. 2, the separation portions 130 may be formed to overlap each side of the first mesh pattern 110 in a plan view.

Figure 4:
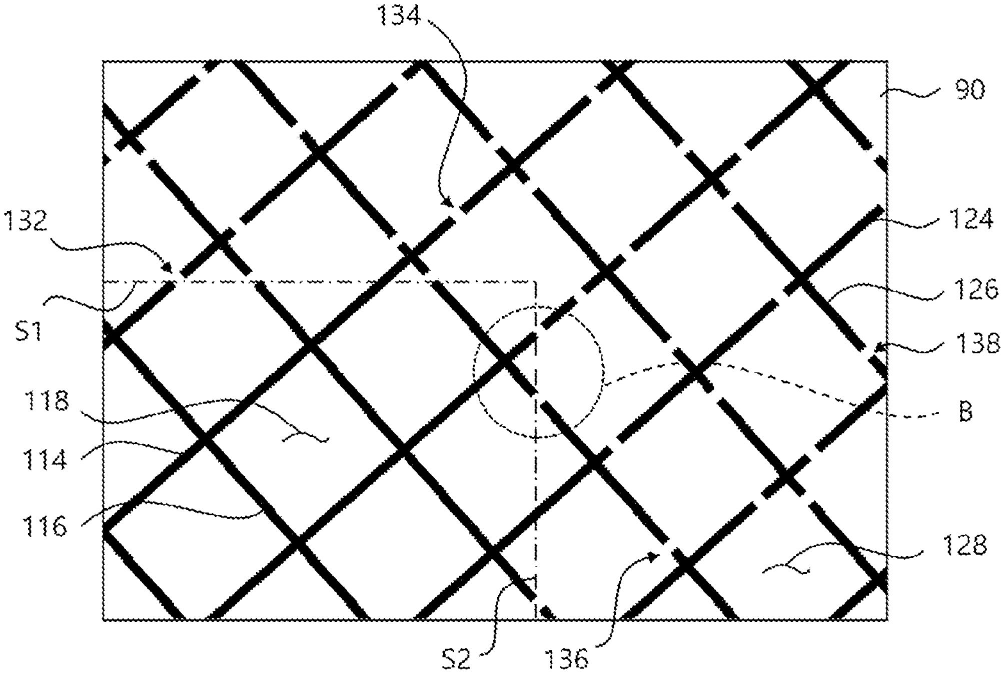
FIG. 4 is a schematic plan view illustrating a conductive mesh structure in accordance with exemplary embodiments.

FIG. 4 is a schematic plan view illustrating a conductive mesh structure in accordance with exemplary embodiments.

Referring to FIG. 4, the separation portions 130 may be randomly distributed. For example, at least some of the separation portions 130 may be adjacent to each side of the first mesh pattern 110.

For example, a first side S1 of the first mesh pattern 110 may be defined by an imaginary straight line passing through at least three separation portions 132. A second side S2 of the first mesh pattern 110 may be defined by an imaginary straight line passing through at least three different separation portions 132.

In an embodiment, the separation portions 134 that may not be located on the first side S1 may be formed around the first side S1 of the first mesh pattern 110. Further, the separation portions 136 that may not be located on the second side S2 of the first mesh pattern 110 may be formed around the second side S2.

The conductive mesh structure may include the separation portions 134 and 136 that may not be formed on each of the sides S1 and S2 defining the shape of the first mesh pattern 110, but may be formed around the sides S1 and S2, so that irregularity and randomness of the pattern shape may be increased.

Thus, regular contrast repetition and contrast differences caused when the separation portions 130 are regularly arranged or repeated may be prevented or reduced. Therefore, patterns and electrodes may be prevented from being recognized by the user. For example, moiré generation due to an regular overlap with pixel electrodes of an image display device may also be prevented.

Figure 5:
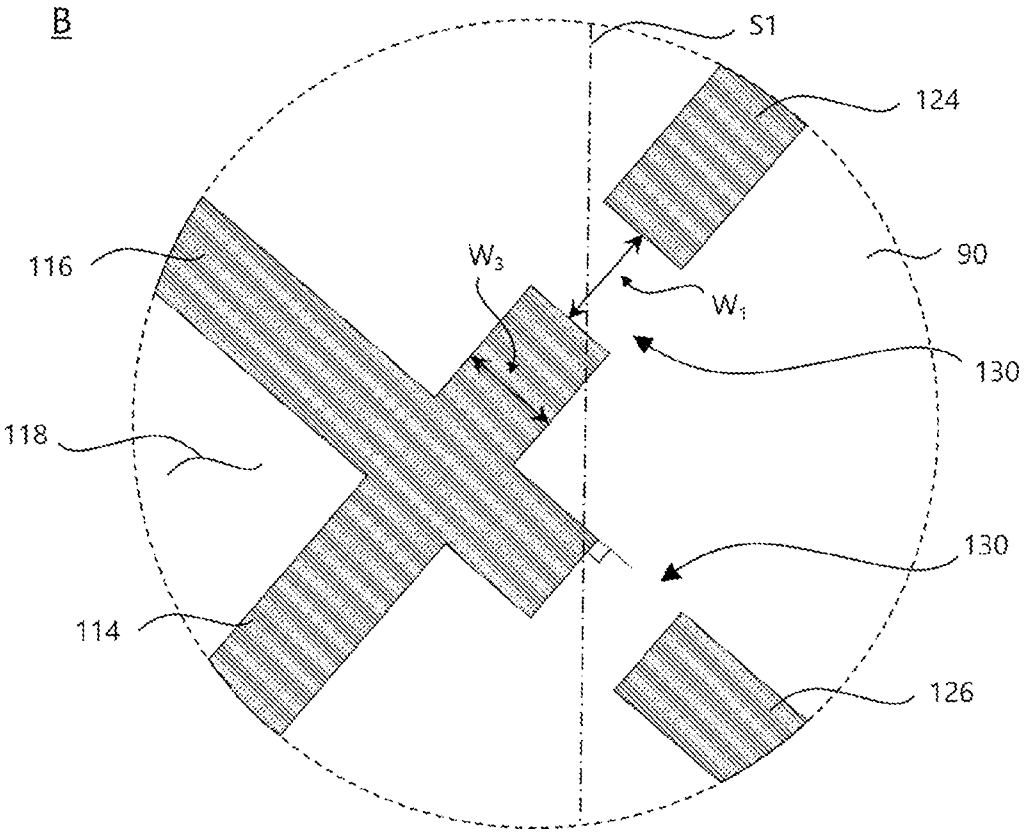
FIG. 5 is an enlarged plan view of a region B of FIG. 4.

FIG. 5 is an enlarged plan view of a region B of FIG. 4.

Referring to FIG. 5, one end of the conductive line 112 may be perpendicular to an extending direction of the conductive line 112. For example, the separation portion 130 may be formed to be perpendicular to the extending direction of each of the conductive lines 112.

In some embodiments, one end of the conductive line 112 may be inclined at a predetermined inclination angle θ with respect to the extending direction of the conductive line 112. For example, the separation portion 130 may be formed to be inclined with respect to the extending direction of each of the conductive lines 112.

For example, referring to FIG. 3, at least some of the conductive lines 112 may have an inclined end portion. Accordingly, the shape of the separation portions 130 in the conductive mesh structure may become irregular, so that the electrode visibility or moiré phenomenon due to a regular repetition of the pattern shape may be further reduced or alleviated.

In one embodiment, the inclination angle θ may be 5° or more and less than 90°, and may be in a range from 10° to 80°, from 20° to 75° or from 30° to 60°.

In one embodiment, one end of the dummy line 122 adjacent to the conductive line 112 may be inclined at a predetermined inclination angle with respect to the extension direction of the dummy line 122, or may be perpendicular to the extension direction of the dummy line 122.

Figure 6:
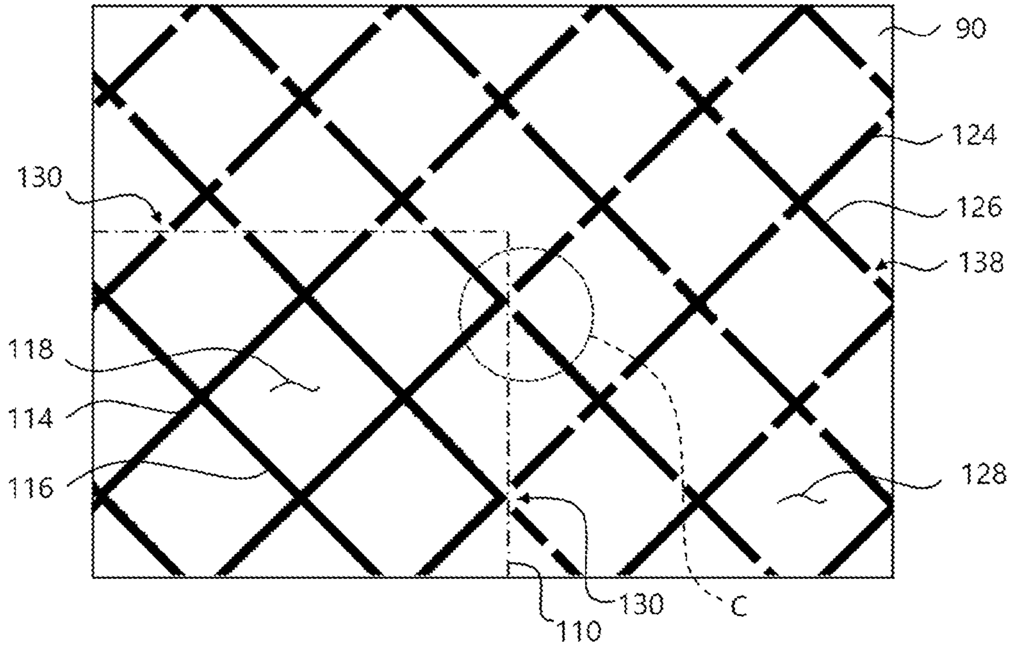
FIG. 6 is a schematic plan view illustrating a conductive mesh structure in accordance with exemplary embodiments.

FIG. 6 is a schematic plan view illustrating a conductive mesh structure in accordance with exemplary embodiments.

Referring to FIG. 6, the separation portions 130 may be formed on each side of the first mesh pattern 110. For example, the boundary of the first mesh pattern 110 having the polygonal shape may be defined by imaginary straight lines connecting the neighboring separation portions 130.

In some embodiments, the separation portions 130 may be formed at an intersection region where the conductive lines 114 and 116 meet each other. For example, the separation portions 130 may be located around a vertex portion of a unit cell defined by the conductive lines 114 and 116 crossing each other.

Figure 7:
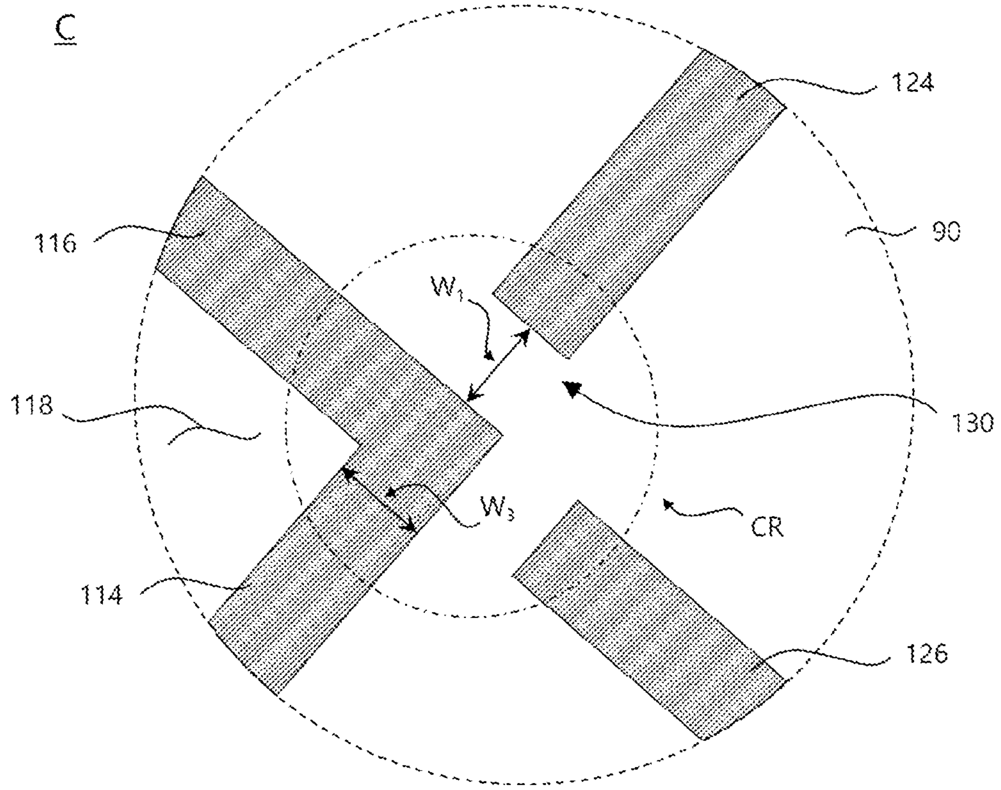
FIG. 7 is an enlarged plan view of a region C of FIG. 6.

FIG. 7 is an enlarged plan view of an area C of FIG. 6.

Referring to FIG. 7, the separation portion 135 may be formed in an intersection region CR of the first conductive line 114 and the second conductive line 116. For example, the separation portion 135 may be formed to surround a vertex portion of a first unit cell 118.

In example embodiments, a width of the first unit cell 118 may be greater than the width W1 of the separation portion 130. For example, the width of each of the first unit cells 118 may be a distance between sides facing each other among sides of each of the first unit cells 118.

For example, if the width of the first unit cell 118 is less than or equal to the width of the separation portion 130, the first mesh pattern 110 may be visually recognized by the separation portion 130 having a size larger than that of the first unit cell 118.

In an embodiment, the width of the segmented portion 138 may be smaller than the width of the first unit cell 118 and a width of the second unit cell 128. Accordingly, visual recognition of the separation portion 130 and the segmented portion 138 may be suppressed, and optical properties of the conductive mesh layer 100 may be improved.

In example embodiments, the first mesh pattern 110, the second mesh pattern, and the separation portions 130 may be formed together. For example, the conductive mesh layer 100 may be formed through a substantially single etching process.

For example, a conductive layer may be formed on the dielectric layer 90. The conductive layer may be etched to form the first and second conductive lines 114 and 116 and the first and second dummy lines 124 and 126. Through the etching process, the separation portions 130 between the first and second conductive lines 114 and 116 and the first and second dummy lines 124 and 126 may be simultaneously formed. For example, the conductive layer may be etched according to a design construction in which the line width of the conductive line 112 and the width of the separation portion 130 and the segmented portion 138 mat satisfy the above-described relation.

An antenna device according to example embodiments may include the conductive mesh structure as described above.

Figure 8:
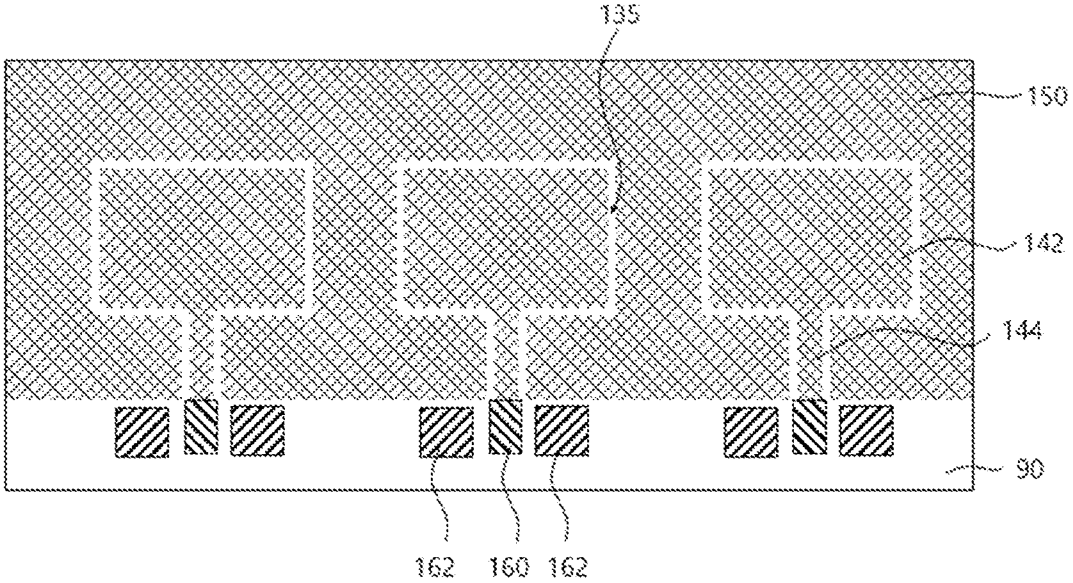
FIG. 8 is a schematic plan view illustrating an antenna device in accordance with exemplary embodiments.

FIG. 8 is a schematic plan view illustrating an antenna device in accordance with exemplary embodiments.

Referring to FIG. 8, an antenna device may include a dielectric layer 90 and an antenna unit disposed on the dielectric layer 90. A dummy pattern 150 may be formed around the antenna unit.

Impedance or inductance to the antenna unit may be formed by the dielectric layer 90, so that a frequency band that the antenna device 100 may be driven or operated may be adjusted. In some embodiments, a dielectric constant of the dielectric layer 90 may be adjusted in a range from about 1.5 to about 12. If the dielectric constant exceeds about 12, a driving frequency may be excessively reduced so that driving in a high frequency band may not be implemented.

In example embodiments, the antenna unit may include a radiator 142 and a transmission line 144 connected to the radiator 142.

The antenna unit may include the above-described first mesh pattern. For example, the radiator 142 and/or the transmission line 144 may include the first mesh pattern.

The antenna unit or the radiator 142 may be designed to have a resonance frequency in a high or ultra-high frequency band of, e.g., 3G, 4G, 5G, or more. For example, the resonance frequency of the antenna unit may be in a range from about 20 GHz to 80 GHz.

The radiator 142 may have a polygonal plate shape such as a rectangle, a square, a trapezoid, a rhombus, a hexagon, etc.

The transmission line 144 may extend from one side of the radiator 142. For example, the transmission line 144 may be connected to the radiator 142 and extend in a straight line shape along a length direction of the antenna unit.

In one embodiment, the transmission line 144 may be formed as a single member substantially integral with the radiator 142.

The dummy pattern 150 may include the second mesh pattern as described above. The dummy pattern 150 may be separated from the radiator 142 and the transmission line 144 by a separation region 135. The separation region 135 may be defined by the separation portions 130.

The dummy pattern 150 may include the above-described second mesh pattern to be positioned around the antenna unit, so that the distribution of the conductive pattern of the antenna device may become uniform. Accordingly, the antenna unit or the conductive pattern may be prevented from being recognized by the user.

In some embodiments, both the radiator 142 and the transmission line 144 may include the first mesh pattern. Accordingly, optical transmittance and non-visibility of the antenna unit may be entirely improved.

In some embodiments, the transmission line 144 may include a solid structure to provide a low resistance.

The antenna unit may include a signal pad 160 connected to one end of the transmission line 144. The signal pad 160 may be electrically connected to an antenna driving integrated circuit (IC) chip through a circuit board, e.g., a printed circuit board (PCB) and a flexible printed circuit board (FPCB). Accordingly, feeding and driving signals may be applied to the radiator 142 through the signal pad 160.

In one embodiment, the signal pad 160 may be electrically connected to the circuit board through a conductive intermediate structure such as an anisotropic conductive film (ACF).

The circuit board may be connected to an intermediate circuit board on which the driving IC chip is mounted or directly mounted. In an embodiment, the intermediate circuit board may be a rigid printed circuit board.

In some embodiments, a ground pad 162 may be disposed around the signal pad 160. For example, a pair of the ground pads 162 may be disposed to be electrically and physically separated from the transmission line 155 and the signal pad 160 with the signal pad 160 interposed therebetween.

Noises around the signal pad 160 may be absorbed or shielded by the ground pad 162, and a bonding process of the circuit board to the antenna element may be easily performed.

The signal pad 160 and the ground pad 162 may be formed as a solid pattern including the above-mentioned metal or alloy. In some embodiments, the signal pad 160 and the ground pad 162 may not overlap, e.g., the pixel structure of the image display device.

Figure 9:
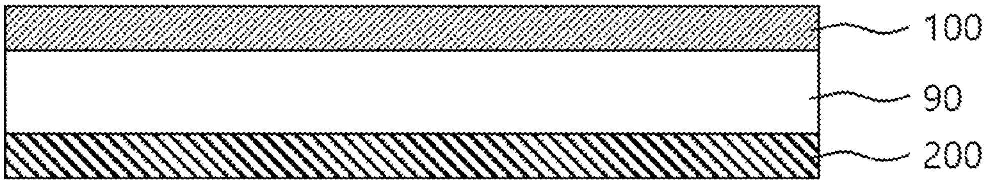
FIG. 9 is a schematic cross-sectional view illustrating an antenna device in accordance with exemplary embodiments.

FIG. 9 is a schematic cross-sectional view illustrating an antenna device in accordance with exemplary embodiments.

Referring to FIG. 9, the antenna element may further include a ground layer 200. The ground layer 200 may be disposed on a bottom surface of the dielectric layer 90.

In some embodiments, the ground layer 200 may be disposed to overlap the antenna unit in the plan view. An electric field generation in the radiator 142 and the transmission line 144 may be further promoted by the ground layer 200, and electrical noises around the radiator 142 and the transmission line 144 may be absorbed or shielded.

In one embodiment, a conductive member of the image display device or the display panel to which the antenna device is applied may serve as the ground layer 200.

For example, the conductive member may include electrodes or wirings such as a gate electrode, source/drain electrodes, a pixel electrode, a common electrode, a data line, a scan line included in a thin film transistor (TFT) array panel.

In one embodiment, a metallic member such as an SUS plate, a sensor member such as a digitizer, and a heat dissipation sheet disposed at a rear portion of the image display device may serve as the ground layer.

Hereinafter, preferred embodiments are provided to help understanding of the present invention, but these embodiments are merely illustrative of the present invention and do not limit the scope of the attached patent claims, and it is obvious to those skilled in the art that various changes and modifications to the embodiments are possible within the scope of the present invention. These modifications are to be interpreted as being within the scope of the attached claims.

EXPERIMENTAL EXAMPLE

(1) Examples and Comparative Examples

Conductive lines and dummy lines including Cu and having the same thickness were formed on a COP dielectric layer (Cyclic Olefin Polymer) having a transmittance of 91.1% under the conditions shown in Table 1 to form the conductive mesh structure as illustrated in FIG. 2.

TABLE 1

| | width of separation portion $W_1$(μm) | width of segmented portion $W_2$(μm) | line width of conductive line $W_3$(μm) | $W_1/W_2$ | $W_1/W_3$ |
|---|---|---|---|---|---|
| Example 1 | 4.0 | 2.7 | 2.5 | 1.48 | 1.6 |
| Example 2 | 3.5 | 4.0 | 2.5 | 0.88 | 1.4 |
| Example 3 | 6.0 | 4.0 | 5.0 | 1.5 | 1.2 |
| Example 4 | 4.0 | 4.0 | 4.0 | 1.0 | 1.0 |
| Example 5 | 3.0 | 2.7 | 3.0 | 1.11 | 1.0 |
| Example 6 | 3.5 | 4.0 | 5.0 | 0.88 | 0.7 |
| Comparative Example 1 | 4.5 | 2.7 | 2.5 | 1.67 | 1.8 |
| Comparative Example 2 | 2.5 | 4.0 | 5.0 | 0.63 | 0.5 |
| Comparative Example 3 | 5.0 | 2.7 | 3.0 | 1.85 | 1.67 |

(2) Evaluation on Visual Recognition of Pattern

A pattern recognition of the conductive mesh structures of Examples and Comparative Examples was evaluated through a visual observation. Specifically, a probability of recognition was evaluated through the number of panels who evaluated that the pattern was clearly visually recognized from 10 panels. For example, if 6 out of the panels evaluated that the pattern is recognized, the probability of recognition is 60%.

The evaluation standard is as follows:

<Evaluation Standard>

○: The probability of recognition was 20% or less

Δ: The probability of recognition was greater than 20% and less than 60%.

X: The probability of recognition was 60% or more,

(3) Evaluation of Signal Loss

An antenna device was manufactured using each conductive mesh structure of Examples and Comparative Examples. Specifically, The antenna device was manufactured so that the first mesh pattern served as a single radiator (2.8 mm×2.8 mm) and the second mesh pattern served as a dummy pattern. A radiation gain of the antenna device was measured at 28 GHz using Network Analyzer and a changed amount compared to an average (8 dBi) was evaluated.

The evaluation standard is as follows.

<Evaluation Standard>

○: 8 dB or more

Δ: greater than 7.5 dB and less than 8 dB

X: less than 7.5 dB

TABLE 2

| | pattern recognition | signal loss |
|---|---|---|
| Example 1 | Δ | Δ |
| Example 2 | ○ | Δ |
| Example 3 | Δ | ○ |
| Example 4 | ○ | ○ |
| Example 5 | ○ | ○ |
| Example 6 | ○ | ○ |
| Comparative Example 1 | X | Δ |
| Comparative Example 2 | ○ | X |
| Comparative Example 3 | X | ○ |

Referring to Tables 1 and 2, in Examples, the optical transmittance of the conductive mesh structure was increased and the pattern recognition was suppressed. Further, an electrical insulation between the radiator and the dummy pattern was enhanced, and the signal loss and interference of the radiator by the dummy pattern were suppressed.

However, in Comparative Examples, the conductive mesh structure provided low optical transmittance or high signal loss. For example, as the width of the separation portion with respect to the line width of the conductive line was excessively large, the probability of recognition of the first mesh pattern to the user was increased. Further, the width of the separation portion with respect to the the line width of the conductive line became excessively small, thereby causing the short-circuit between the radiator and the dummy pattern to generate a parasitic capacitance, and increasing the signal loss of the antenna device.

What is claimed is:

1. A conductive mesh structure comprising:

a dielectric layer;

a first mesh pattern disposed on a top surface of the dielectric layer, the first mesh pattern comprising conductive lines that intersect each other;

a second mesh pattern disposed on the top surface of the dielectric layer, the second mesh pattern comprising dummy lines that intersect each other and segmented portions that cut portions of each of the dummy lines; and separation portions separating the first mesh pattern and the second mesh pattern, wherein a width of each of the separation portions is defined as a minimum separation distance between each of the conductive lines and each of the dummy lines adjacent to each of the conductive lines, and a width of the segmented portion is defined as a minimum separation distance between one ends of the dummy line cut by the segmented portion, wherein a ratio of the width of each of the separation portions to the width of each of the segmented portions is in a range from 0.7 to 1.6, wherein a ratio of the width of each of the separation portions to a line width of each of the conductive lines is in a range from 0.7 to 1.6.

2. The conductive mesh structure of claim 1, wherein the first mesh pattern has a polygonal shape defined by straight lines passing through at least three of the separation portions.

3. The conductive mesh structure of claim 2, wherein the separation portions are formed to overlap each side of the polygonal shape in a plan view, or to be adjacent a periphery of each side of the polygonal shape.

4. The conductive mesh structure of claim 3, wherein some of the separation portions are adjacent to the periphery of each side of the polygonal shape.

5. The conductive mesh structure of claim 1, wherein one end of each of the conductive lines is inclined with respect to an extension direction of each of the conductive lines.

6. The conductive mesh structure of claim 1, wherein the first mesh pattern has first unit cells defined by neighboring conductive lines of the conductive lines, and the first unit cells have a diamond shape or a polygonal shape.

7. The conductive mesh structure of claim 6, wherein a distance between facing sides of each of the first unit cells is greater than the width of each of the separation portions.

8. The conductive mesh structure of claim 1, wherein the second mesh pattern has second unit cells defined by neighboring dummy lines of the dummy lines, and each of the second unit cells at least one segmented portion of the segmented portions.

9. The conductive mesh structure of claim 8, wherein the at least one segmented portion is formed on at least one side of the second unit cell.

10. The conductive mesh structure of claim 9, wherein the at least one segmented portion is formed on each of facing sides of the second unit cell, and a straight line connecting segmented portions formed on the facing sides is inclined with respect to a direction perpendicular to an extension direction of the facing sides.

11. The conductive mesh structure of claim 1, wherein the conductive lines comprise first conductive lines and second conductive lines that intersect each other, and the dummy lines comprise first dummy lines and second dummy lines that intersect each other.

12. The conductive mesh structure of claim 11, wherein the first conductive lines and the first dummy lines are parallel to each other, and the second conductive lines and the second dummy lines are parallel to each other.

13. An antenna device comprising the conductive mesh structure according to claim 1.

14. The antenna device of claim 13, comprising:

an antenna unit comprising the first mesh pattern; and a dummy pattern disposed around the antenna unit, the dummy pattern comprising the second mesh pattern.

15. The antenna device of claim 14, wherein the antenna unit comprises a radiator and a transmission line connected to the radiator.

16. The antenna device of claim 15, wherein the antenna unit further comprises a signal pad connected to the transmission line, and the radiator and the transmission line comprise the first mesh pattern, and the signal pad has a solid structure.

17. The antenna device of claim 13, further comprising a ground layer disposed on a bottom of the dielectric layer.

18. An image display device comprising the antenna device according to claim 13.

* * * * *